United States Patent
Shimada

(10) Patent No.: US 8,582,813 B2
(45) Date of Patent: Nov. 12, 2013

(54) OBJECT DETECTION DEVICE WHICH DETECTS OBJECT BASED ON SIMILARITIES IN DIFFERENT FRAME IMAGES, AND OBJECT DETECTION METHOD AND COMPUTER-READABLE MEDIUM RECORDING PROGRAM

(75) Inventor: Keisuke Shimada, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/295,322

(22) Filed: Nov. 14, 2011

(65) Prior Publication Data

US 2012/0128206 A1 May 24, 2012

(30) Foreign Application Priority Data

Nov. 22, 2010 (JP) ................. 2010-260028

(51) Int. Cl.
*G06K 9/00* (2006.01)
(52) U.S. Cl.
USPC ......................................... 382/103
(58) Field of Classification Search
None
See application file for complete search history.

(56) References Cited

U.S. PATENT DOCUMENTS

| 8,218,833 | B2 | 7/2012 | Iwamoto | |
| 2005/0041886 | A1* | 2/2005 | Wada | 382/305 |
| 2007/0046426 | A1* | 3/2007 | Ishibashi | 340/5.52 |
| 2009/0185717 | A1* | 7/2009 | Watanabe et al. | 382/103 |
| 2009/0316962 | A1* | 12/2009 | Sun et al. | 382/118 |
| 2010/0100835 | A1* | 4/2010 | Klaric et al. | 715/765 |

FOREIGN PATENT DOCUMENTS

| JP | 2005-318515 A | 11/2005 |
| KR | 2010-0030596 A | 3/2010 |

OTHER PUBLICATIONS

Korean Office Action dated May 31, 2013 (and English translation thereof) in counterpart Korean Application No. 10-2011-0121432.

* cited by examiner

*Primary Examiner* — Nirav G Patel
(74) *Attorney, Agent, or Firm* — Holtz, Holtz, Goodman & Chick, PC

(57) ABSTRACT

An object detection device includes: an obtaining unit successively obtaining frame images; a first determination unit determining whether a first similarity between a reference image and a first image region in one of the obtained frame images is less than a first threshold value; a second determination unit determining whether a second similarity between the reference image and a second image region, included in a frame image obtained before the one of the frame images and corresponding to the first image region, is less than a second threshold value larger than the first threshold value, when the first determination unit determines that the first similarity is not less than the first threshold value; and a detection unit detecting the first image region as a region of a particular object image when the second determination unit determines that the second similarity is not less than the second threshold value.

7 Claims, 3 Drawing Sheets

OBJECT DETECTION DEVICE WHICH DETECTS OBJECT BASED ON SIMILARITIES IN DIFFERENT FRAME IMAGES, AND OBJECT DETECTION METHOD AND COMPUTER-READABLE MEDIUM RECORDING PROGRAM

BACKGROUND OF THE INVENTION

1. Field of the Invention

The present invention relates to an object detection device, an object detection method, and a computer-readable medium recording a program therefor.

2. Description of Related Art

As a conventional technique, Japanese Patent Laid-open Publication No. 2005-318515 discloses a technique to detect a face in frame images successively obtained by capturing images.

SUMMARY OF THE INVENTION

An object of the present invention of this application is to provide an object detection device, an object detection method, and a computer-readable medium recording a program, which are capable of reducing incorrect detection of a particular object and thereby increasing the accuracy in detecting the particular object.

According to a first aspect of the present invention, there is provided an object detection device, including: an obtaining unit for successively obtaining frame images; a first determination unit for determining whether a first similarity between a reference image and a first image region in one of the obtained frame images, is equal to or more than a first threshold value; a second determination unit for determining whether a second similarity between the reference image and a second image region, which is included in a frame image obtained before the one of the frame images and is corresponding to the first image region, is equal to or more than a second threshold value larger than the first threshold value, when the first determination unit determines that the first similarity is equal to or more than the first threshold value; and a detection unit for detecting the first image region as a region of a particular object image when the second determination unit determines that the second similarity is equal to or more than the second threshold value.

According to a second aspect of the present invention, there is provided a method of detecting an object, including the steps of: successively obtaining frame images; determining whether a first similarity between a reference image and a first region in one of the obtained frame images is equal to or more than a first threshold value; determining whether a second similarity between the reference image and an image region, which is included in a frame image obtained before the one of the frame images and is corresponding to the first region, is equal to or more than a second threshold value larger than the first threshold value, when the first determination unit determines that the first similarity is equal to or more than the first threshold value; and detecting the first region as a region of a particular object image when determining that the second similarity is equal to or more than the second threshold value.

According to a third aspect of the present invention, there is provided a computer-readable medium storing a program for causing a computer included in an object detection device to function as: an obtaining unit for successively obtaining frame images; a first determination unit for determining whether a first similarity between a reference image and a first image region in one of the obtained frame images, is equal to or more than a first threshold value; a second determination unit for determining whether a second similarity between the reference image and an image region, which is included in a frame image obtained before the one of the frame images and is corresponding to the first image region, is equal to or more than a second threshold value larger than the first threshold value, when the first determination unit determines that the first similarity is equal to or more than the first threshold value; and a detection unit for detecting the first image region as a region of a particular object image when the second determination unit determines that the second similarity is equal to or more than the second threshold value.

BRIEF DESCRIPTION OF THE DRAWINGS

The above and other objects, advantages and characteristics of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Figure 1:
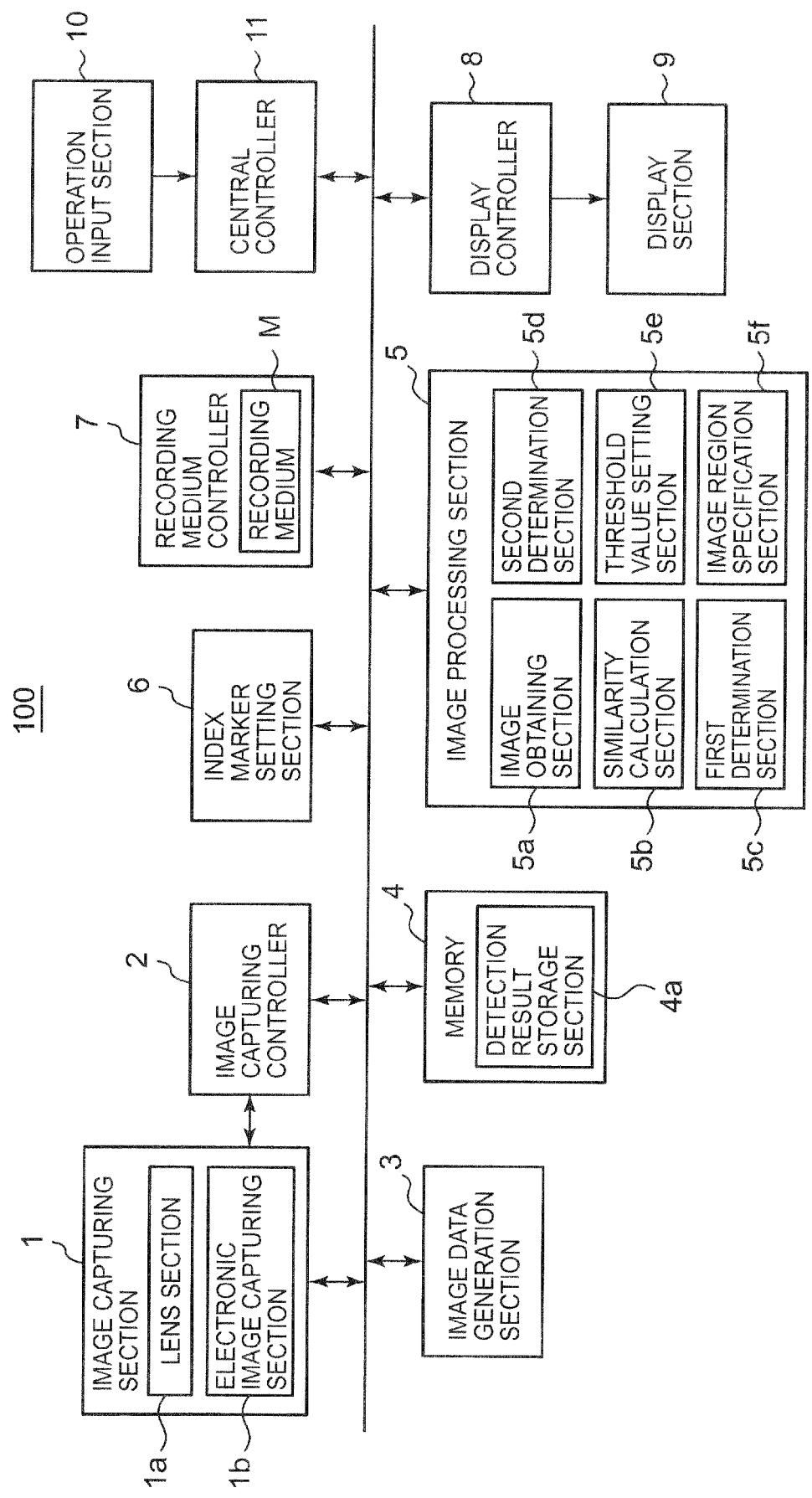
FIG. 1 is a block diagram showing a schematic configuration of an image capturing device of an embodiment to which the present invention is applied.

Hereinafter, a present invention is described with reference to the drawings. The scope of the invention is not limited to the example shown in the drawings.

FIG. 1 is a block diagram showing a schematic configuration of an image capturing device 100 as an embodiment to which the present invention is applied.

The image capturing device 100 of the embodiment determines whether the similarity (the first similarity) between an image of a candidate region for an object image to be detected in one frame image and a predetermined reference image as a criterion for determining the particular object image is equal to or more than a first threshold value. Then, if it is determined in the above determination process that the first similarity of the image of the candidate region is equal to or more than the first threshold value, the image capturing device 100 determines whether the similarity (the second similarity) between the predetermined reference image and an image of a region corresponding to the above candidate region in another frame image is equal to or more than a second threshold value. Herein, the another frame image is a frame image predetermined number of frames before the one frame image. The image capturing device 100 specifies the candidate region corresponding to the corresponding region having the second similarity equal to or more than the second threshold value in the one frame image as an image region of the particular object image. Herein, the second similarity may be the same as the first similarity or may be different from the first similarity.

As shown in FIG. 1, specifically, the image capturing device 100 includes an image capturing section 1, an image capturing controller 2, an image data generation section 3, a memory 4, an image processing section 5, an index marker setting section 6, a recording medium controller 7, a display controller 8, a display section 9, an operation input section 10, and a central controller 11.

The image capturing section 1 captures images of an object and generates frame images F, as an image capturing unit. Specifically, the image capturing section 1 includes a lens section 1a and an electronic image capturing section 1b.

The lens section 1a is composed of a plurality of lenses including a zoom lens and a focus lens.

The electronic image capturing section 1b is composed of an image sensor such as a CCD (charge coupled device) or a CMOS (complementary metal-oxide semiconductor). The electronic image capturing section 1b converts an optical image obtained after passing through the various lenses of the lens section 1a into a two-dimensional image signal.

The image capturing section 1 may be provided with a diagram (not shown in the drawings) adjusting the amount of light passing through the lens section 1a.

The image capturing controller 2 controls the image capturing section 1 to capture an object. The image capturing controller 2 includes a timing generator, a driver, and the like, which are not shown in the drawings. The image capturing controller 2 drives the electronic image capturing section 1b with the timing generator and the driver to scan. The image capturing controller 2 then causes the electronic image capturing section 1b to convert the optical image to the two-dimensional image signal with a predetermined period. The image capturing controller 2 then reads frame images F from an image area of the electronic image capturing section 1b one screen by one screen based on the converted image signal and output the same to the image data generator 3.

The image capturing controller 2 adjusts and controls image capturing conditions for image capturing an object, such as AF (automatic focus), AE (automatic exposure), and AWB (automatic white balance).

The image data generation section 3 properly adjusts the gains of R, G, and B color components of the analog signal of the frame image F transferred from the electronic image capturing section 1b. The image data generation section 3 then samples and holds the analog signal with a sample and hold circuit (not shown) for conversion into digital data with an A/D converter (not shown). The image data generation section 3 performs a color processing including pixel interpolation and gamma correction to the converted digital data with a color process circuit (not shown) and then generates a digital luminance signal Y and digital color-difference signals Cb and Cr (YUV data).

Moreover, the image data generation section 3 performs image size reduction process for the generated YUV data of the frame image F horizontally and vertically at predetermined magnification factors to generate low-resolution image data for live view display (VGA, GVGA, or the like, for example). Specifically, the image data generation section 3 generates the low-resolution image data for live view display from the YUV data of the frame image F at predetermined timings according to a predetermined display frame rate at which the live view image is displayed by the display section 9.

The YUV data outputted from the color processing circuit is DMA transferred to the memory 4 used as a buffer memory through a not-shown DMA controller.

The memory 4 is composed of a DRAM (dynamic random access memory) or the like, for example, and temporarily stores data or the like to be processed by the image data generation section 3, image processing section 5, index marker setting section 6, central controller 11, and the like. Specifically, the memory 4 temporarily stores image data for live view display of a predetermined number of the frame images F generated by the image data generation section 3.

The memory 4 includes a detection result storage section 4a temporarily storing various types of information concerning a later-described object detection process.

The detection result storage section 4a is composed of a ring buffer, for example. The detection result storage section 4a sequentially stores, as a data record, similarities between the predetermined reference image and images of candidate regions for the particular object image in the predetermined number of frame images F (candidate regions A, see FIG. 3A). The first similarities are previously calculated by the similarity calculation section 5b of the image processing section 5. The candidate regions A in a frame image Fm which include the coordinates corresponding to the coordinates of the candidate regions A in the frame image Fn (the coordinates of the center or four corners of the rectangular region, for example) are regions B (see FIG. 3B) corresponding to the candidate regions (candidate regions A) for the particular object image. Herein, the frame image Fm is generated by the image data generation section 3 a predetermined number of frames (one frame, for example) before the frame image Fn.

In other words, the detection result storage section 4a as a storage unit stores the second similarities between the predetermined reference image and the images of the regions B in the frame image Fm corresponding to the candidate regions A of the frame image Fn, the second similarities being previously calculated by the similarity calculation section 5b.

The image processing section 5 includes an image obtaining section 5a, the similarity calculation section 5b, a first determination section 5c, a second determination section 5d, a threshold value setting section 5e, and an image region specification section 5f.

The image obtaining section 5a successively obtains frame images F.

Specifically, the image obtaining section 5a successively obtains from the memory 4, image data for live view display of the frame images F generated at predetermined timings according to the display frame rate of the image data generation section 3.

The similarity calculation unit 5b calculates the first similarities between the predetermined reference image and images of candidate regions for the particular object image in each frame image F.

The similarity calculation section 5b performs various types of image processing including face detection processing, edge detection processing, and characteristic extraction processing, for example, for the image data for live view display in each of the frame images F successively obtained by the image obtaining section 5a. Then, the similarity calculation section 5b extracts a plurality of image regions as candidates for the particular object image (candidate regions A) (see FIG. 3A). Specifically, from the image data for live view display of frame image Fn obtained at a predetermined timing by the image obtaining section 5a, the similarity calculation section 5b generates a plurality of candidate regions A (candidate regions A1 to A3, for example) of a predetermined size (24×24 pixels, for example) as the candidate regions for the particular object image. The similarity calculation section 5b calculates the first similarity between the image data of the predetermined reference image and the image data of each candidate region A using an Adaboost calculation algorithm, for example.

The method of calculating similarities by the similarity calculation section 5b is by way of example, and the invention is not limited to this method. The similarity calculation method may be arbitrarily changed.

The image data of the predetermined reference image is information stored in a temporary storage unit (not shown) of the image processing section 5, for example, and includes various types of identification information for determining whether each candidate region A includes a particular object. Examples of the identification information are shape-based information such as a "human face" or an "animal", color-based information such as bright (bold) color with high brightness and intensity or skin tone, and size-based information such as a proportion thereof to an image of an entire angle of view (for example, whether equal to or more than a half of the entire image).

The face detection processing, the edge detection processing, and the characteristic extraction processing are publicly-known techniques, thus the detailed description thereof is omitted.

The first determination section 5c determines whether the first similarity between image data of each candidate region A in the frame image Fn and image data of the predetermined reference image is equal to or more than a first threshold value.

Specifically, the first determination section 5c determines whether the first similarity (calculated by the similarity calculation section 5b) between the image data of the predetermined reference image and the image data of each candidate region A as a candidate region for the particular object image in the frame image Fn is equal to or more than the first threshold value set by the threshold value setting section 5e. Based on the coordinates of the predetermined position (for example, the center or the like) of each candidate region A (candidate region for the particular object image) which is determined to have the first similarity equal to or more than the first threshold value, the first determination section 5c may generate a similarity map indicating the positions of such candidate regions A in the image data for live view display of the frame image Fn.

As described above, the first determination section 5c determines whether the first similarity between the predetermined reference image as a criterion for determining the particular object image and an image of a candidate region for the particular object image in the frame image Fn obtained by the image obtaining section 5a (candidate region A) is equal to or more than the first threshold value.

The second determination section 5d determines whether the similarity between the image data of the predetermined reference image and image data of each region B in the frame image Fm is equal to or more than a second threshold value.

Specifically, if it is determined by the first determination section 5c that the first similarity of each candidate region A (a candidate region for the particular object image) is equal to or more than the first threshold value, the second determination section 5d determines whether the second similarity between the image data of the predetermined reference image and the image data of the region B in the frame image Fm a predetermined number of frames (one frame, for example) before the frame image Fn is equal to or more than the second threshold value. Herein, the second threshold value is set by the threshold value setting section 5e and is larger than the first threshold value. To be specific, based on the similarity map concerning the frame image Fm, which is generated the predetermined number of frames before the frame image Fn, the second determination section 5d specifies all the regions including the coordinates corresponding to the coordinates of the candidate regions A having first similarities equal to or more than the first threshold value among a plurality of candidate regions A in the frame image Fm (regions B). The second determination section 5d obtains the second similarity between the image data of the predetermined reference image and the image data of the specified region B from the detection result storage section 4a of the memory 4. The second determination section 5d determines whether the obtained second similarity is equal to or more than the second threshold value.

In such a manner, if it is determined by the first determination section 5c that the first similarity of the image of a candidate region for the particular object image is equal to or more than the first threshold value, the second determination section 5d determines whether the second similarity between the predetermined reference image and the image of the region B corresponding to the candidate region for the particular object image in the frame image Fm is equal to or more than the second threshold value. Herein, the frame image Fm is the predetermined number of frames before the frame image Fn.

The threshold value setting section 5e sets the first and second threshold values concerning the criteria for determination by the first and second determination sections 5c and 5d, respectively.

Specifically, the threshold value setting section 5e sets the first threshold value as the criterion to determine whether or not the first similarity between the predetermined reference image and the image of each candidate region for the particular object image (candidate region A) is equal to or more than the first threshold value. Moreover, the threshold value setting section 5e sets the second threshold value as the criterion for the second determination section 5d to determine whether or not the second similarity between the predetermined reference image and the image of the region B corresponding to each candidate region A (candidate region for the particular object image) is equal to or more than the second threshold value.

To be specific, the threshold value setting section 5e sets the first and second threshold values to predetermined values inputted through a predetermined operation at the operation input section 10 by a user, predetermined values previously set as defaults, or the like.

The image region specification section 5f specifies an image region C of the particular object image in the frame image Fn.

Specifically, if the second determination section 5d determines that the second similarity between the image data of the predetermined reference image and the image data of the region B in the image data for live view display of the frame image Fm is equal to or more than the second threshold value, the image region specification section 5f detects the particular object image by specifying the candidate region A (candidate regions A1, A2 . . . , for example) corresponding to the region B (regions B1, B2 . . . , for example) in the frame image Fn as the image region C of the object image.

As described above, the image region specification section 5f detects the particular object image by specifying a candidate region for the particular object image in the frame image Fn (candidate region A) corresponding to each region B which is determined by the second determination section 5d to have the second similarity equal to or more than the second threshold value as an image region C of the object image.

The index marker setting section 6 sets an index marker to identify the detected object image.

Specifically, if the image region specification section 5*f* specifies an image region C of the object image, the identification information setting unit 6 sets a detection window W to be superimposed on the periphery of the image region C on the display section 9 as the index marker for identifying the particular object image.

As the index marker of the particular object image, the detection window W to be superimposed and displayed on the periphery of the image regions C is shown by way of example. However, the index marker is not limited to this and can be arbitrarily changed to an identification mark or the like as long as the index marker is capable of identifying the particular object image.

As described above, the index marker setting section 6 sets index marker for identifying the particular object image specified by the image region specification section 5*f*.

The recording medium controller 7 controls reading of data from the recording medium M and writing of data to the recording medium M.

Specifically, the recording medium controller 7 records, in the recording medium M, the image data for recording which is encoded in a predetermined compression format (JPEG or the like, for example) by an encoding section (not shown) of the image processing section 5.

The recording medium M is composed of a nonvolatile memory (flash memory) or the like, for example, but not limited to this. The recording medium M can be arbitrarily changed.

The display controller 8 reads the image data for display which is temporarily stored in the memory 4 and makes control of displaying the same in the display section 9.

To be specific, the display controller 8 includes a VRAM (video random access memory), a VRAM controller, a digital video encoder, and the like. The digital video encoder regularly reads the luminance signal Y and color-difference signals Cb and Cr which are read from the memory 4 and stored in the VRAM (not shown) under the control of the central controller 11 and generates a video signal based on the read data to output the same to the display section 9.

The display section 9 is composed of a liquid-crystal display panel, for example, and displays an image captured by the electronic image capturing section 1*b* and the like on a display screen based on the video signal from the display controller 8. To be specific, in a still image capturing mode or a movie capturing mode, the display section 9 displays the live view images while, at a predetermined display frame rate, successively updating a plurality of frame images F generated by capturing an object by the image capturing section 1 and the image capturing controller 2. Moreover, the display section 9 displays an image to be recorded as a still image or displays an image which is being recorded as a movie.

The operation input section 10 is used for predetermined operations of the image capturing device 100. To be specific, the operation input section 10 includes: a shutter button 10*a* concerning an instruction to capture an image of an object (see FIG. 3C); a selection determination button 10*b* concerning an instruction to select a capturing mode, functions, and the like (see FIG. 3C); a zoom button (not shown) concerning an instruction to adjust a zoom amount; and the like. The operation input section 10 outputs to the central controller 11, a predetermined operation signal according to the operation of these buttons.

The central controller 11 is configured to control each section of the image capturing device 100. To be specific, the central controller 11 includes a CPU (central processing unit), a RAM (random access memory), a ROM (read only memory), and the like, which are not shown, and performs various control operations according to the various processing programs (not shown) for the image capturing device 100.

Next, a description is given of an object detection process by the image capturing device 100 with reference to FIGS. 2 and 3A to 3C.

Figure 2:
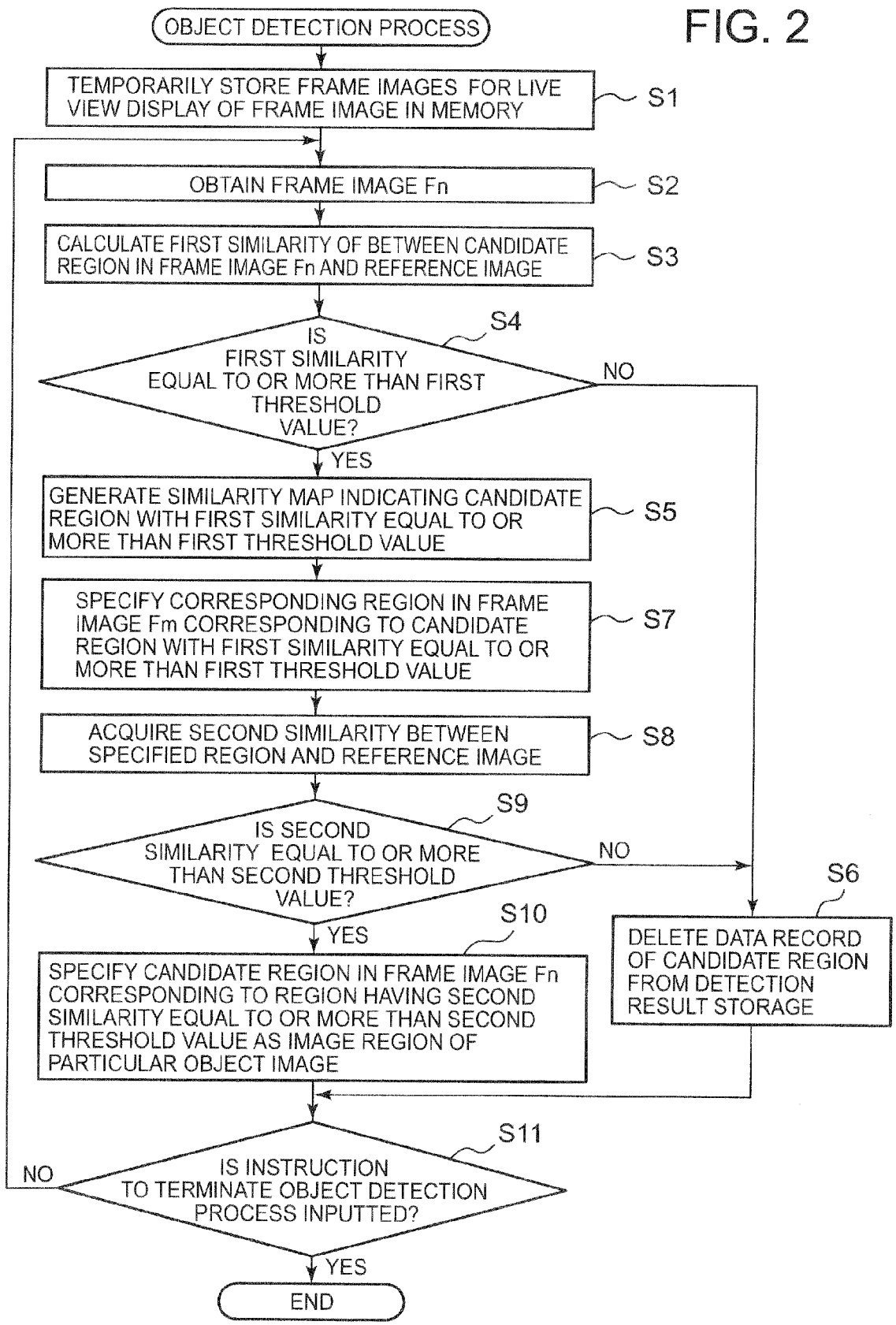
FIG. 2 is a flowchart showing an example of an operation concerning an object detection process by the image capturing device of FIG. 1.
Figure 3A:
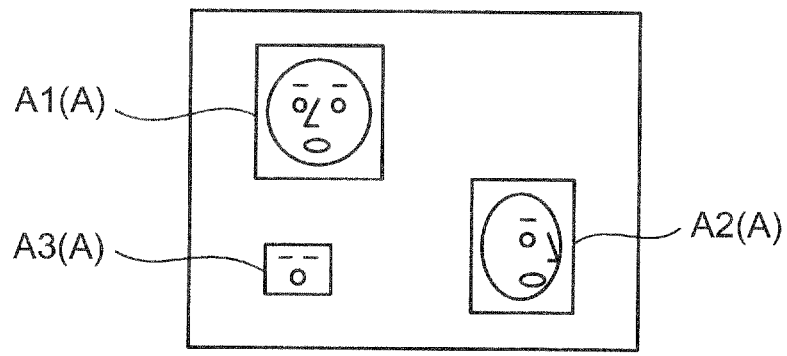
FIG. 3A is a view schematically showing an example of an image concerning the particular object detection process of FIG. 2.
Figure 3B:
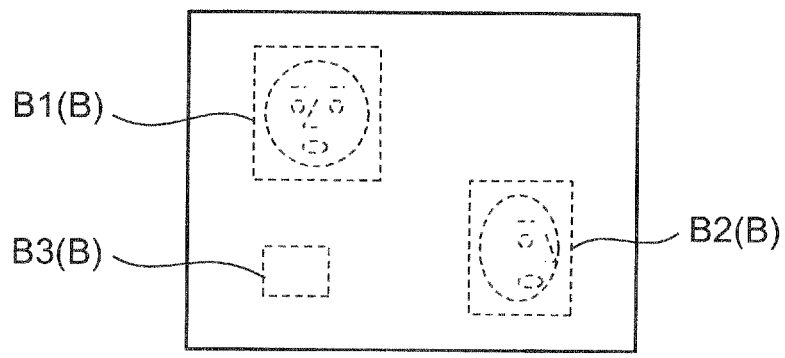
FIG. 3B is a view schematically showing an example of an image concerning the particular object detection process of FIG. 2.
Figure 3C:
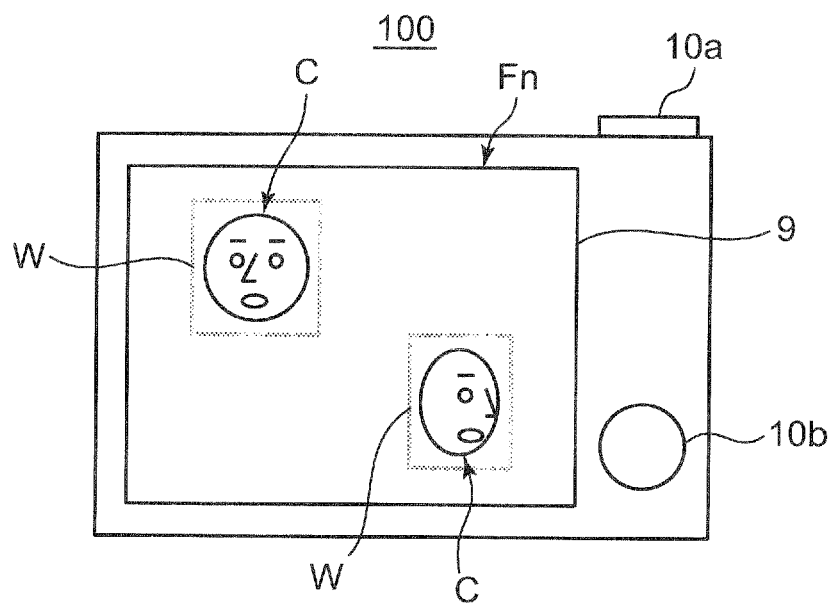
FIG. 3C is a view schematically showing an example of an image concerning the particular object detection process of FIG. 2.

FIG. 2 is a flowchart showing an example of an operation concerning the particular object detection process. FIGS. 3A to 3C are views schematically showing examples of images concerning the particular object detection process.

The particular object detection process described below is executed under the control of the central controller 11 when the particular object detection mode is set based on a predetermined operation of the operation input section 10 by the user. The following description uses frame images F including face images as the particular object image.

As shown in FIG. 2, first, the central controller 11 successively stores image data for live view display of the frame images F successively generated by the image data generation section 3 based on images of an object captured by the image capturing section 1 in the memory 4, and causes the memory to temporarily memorize the image data (step S1).

Subsequently, the image obtaining section 5*a* of the image processing section 5 obtains from the memory 4, the image data for live view display of the frame image Fn to be processed at a predetermined timing according to the display frame rate of the display section 9 (step S2).

Next, the similarity calculation section 5*b* calculates the first similarity between each candidate region A for an object image in the frame image Fn obtained by the image obtaining section 5*a* and the predetermined reference image (step S3).

To be specific, the similarity calculation section 5*b* generates a plurality of candidate regions A1 to A3 (see FIG. 3A) of a predetermined size (24×24 pixels, for example) as candidate regions for the particular object image from the image data for live view display of the frame image Fn. The similarity calculation section 5*b* calculates the first similarity between image data of each of the candidate regions A1 to A3 and the image data of the reference image using the Adaboost calculation algorithm.

The calculated first similarities of the candidate regions A1 to A3 are temporarily stored in the detection result storage section 4*a* of the memory 4.

Subsequently, the first determination section 5*c* determines whether the first similarity of each of the candidate regions A1 to A3 calculated by the similarity calculation section 5*b*, that is, the first similarity between the image data of the predetermined reference image and the image data of each of the candidate regions A1 to A3 in the image data for live view display of the frame image Fn, is equal to or more than the first threshold value (step S4).

Herein, if it is determined that the first similarities of the candidate regions A1 to A3 are equal to or more than the first threshold value (YES in step S4), the first determination section 5*c* generates the similarity map and temporarily stores the generated similarity map in the detection result storage section 4*a* of the memory 4 (step S5). The similarity map indicates the positions of the candidate regions A1 to A3 which are determined to have first similarities equal to or more than the first threshold value in the image data for live view display of the frame image Fn. On the other hand, in the step S4, if it is determined that the first similarity of any one of the candidate regions A1 to A3 is less than the first threshold value (NO in the step S4), the central controller 11 deletes the data record of the first similarity of the candidate region A temporarily stored in the detection result storage section 4a of the memory 4 (step S6).

After the similarity map is generated in the step S5, the second determination section 5d specifies as regions B1 to B3, the regions including coordinates corresponding to the coordinates of the candidate regions A1 to A3 having first similarities equal to or more than the first threshold value in the frame image Fn among the plurality of candidate regions A1 to A3 in the frame image Fm a predetermined number of frames (one frame, for example) before the frame image Fn (step S7). Subsequently, the second determination section 5d obtains the second similarities between the image data of the specified regions B1 to B3 and the image data of the predetermined reference image from the detection result storage section 4a of the memory 4 (step S8).

The second determination section 5d determines whether the second similarity concerning each of the regions B1 to B3, that is, the second similarity of image data of each of the regions B1 to B3 corresponding to the candidate regions A1 to A3 in the image data for live view display of the frame image Fm, is equal to or more than the second threshold value (step S9).

Herein, if it is determined that the second similarity of each region B is equal to or more than the second threshold value (YES in the step S9), the image region specification section 5f specifies as regions C, the candidate regions A (regions A1 and A2, for example) in the frame image Fn corresponding to the regions B (regions B1 and B2, for example), each of which is determined to have the second similarity equal to or more than the second threshold value (step S10). Thereafter, the index marker setting section 6 sets the detection window W to be superimposed on the periphery of each specified region C of the object image and outputs an instruction signal concerning display control of the detection windows W to the display controller 8 (see FIG. 3C).

On the other hand, if it is determined that the second similarity of any one of the regions B is less than the second threshold value (NO in the step S9), the central controller 11 moves the process to the step S6. The central controller 11 deletes the data record of the first similarity of the candidate region A (candidate region A3, for example) corresponding to the region B (region B3, for example) which is temporarily stored in the detection result storage section 4a of the memory 4 (step S6).

Thereafter, the central controller 11 determines whether an instruction to terminate the particular object detection process is inputted (step S11). Specifically, the central controller 11 determines whether the instruction to terminate the particular object detection process is inputted according to whether the instruction to capture an image of the particular object is inputted based on the predetermined operation of the shutter button 10a of the operation input section 10 by the user (a full press operation, for example), whether a mode different from the particular object detection mode is inputted based on a predetermined operation of the selection determination button 10b, or the like.

Herein, if it is determined that the instruction to terminate the particular object detection process is not inputted (NO in the step S11), the central controller 11 moves the process to the step S2, and the image obtaining section 5a obtains the image data for live view display of a new frame image F to be processed from the memory 4 (step S2). The central controller 11 then executes the processes in the step S3 and after in the same way.

On the other hand, if it is determined that the instruction to terminate the particular object detection process is inputted in the step S11 (YES in the step S11), the central controller 11 terminates the particular object detection process.

As described above, according to the image capturing device 100 of the present embodiment, it is determined that the first similarity between the predetermined reference image and an image of a candidate region A for the particular object image (a face image, for example) in the frame image Fn generated by the captured image is equal to or more than the first threshold value. Then, the image capturing device 100 determines whether the second similarity of the region B corresponding to the above candidate region A in the frame image Fm a predetermined number of frames before the frame image Fn is equal to or more than the second threshold value which is larger than the first threshold value. Accordingly, it can be determined using a more severe criterion whether the candidate region A likely to be the particular object image is the object image to be detected in the frame image Fm a predetermined number of frames before the frame image Fn.

The candidate region A in the frame image Fn corresponding to the region B determined to have second similarity equal to or more than the second threshold value is then specified as the region C of the object image. It is therefore possible to reduce incorrect detection of the particular object image. Consequently, according to the present invention, it is possible to increase the accuracy in detecting the particular object image.

Moreover, the second determination section 5d obtains the second similarity between the predetermined reference image and the image of the image B in the frame image Fm which is previously calculated and stored in the memory 4 to determine whether the second similarity is equal to or more than the second threshold value. This eliminates the need to newly calculate the second similarity between the predetermined reference image and the region B corresponding to the candidate region A determined to have first similarity equal to or more than the first threshold value. Thus, it is possible, according to the present invention, to speed up the particular object detection process.

Furthermore, the image capturing device 100 sets the index marker for identifying the region C of the particular object image (the detection window W, for example). Accordingly, the image capturing device allows the user to easily recognize the detected object by the index marker.

The invention is not limited to the aforementioned embodiment. The embodiment can be variously improved and changed in design without departing from the scope of the invention.

For example, in the particular object detection process (see FIG. 2), the particular object image in the frame images F is a human face image, but this is just an example. The particular object image is not limited to this and can be arbitrarily changed.

Moreover, in the above embodiment, the image capturing device 100 includes the index marker setting section 6 to set the identification information for identifying the region C of the specified object image (the detection window W, for example). However, it can be arbitrarily determined whether to provide the index marker setting section 6, that is, whether to set the index marker for identifying the particular object image specified by the image region specification section 5f.

Furthermore, in the aforementioned embodiment, the second similarity between the predetermined reference image and the image of the region B in the frame image Fm which is previously calculated is stored in the memory 4, and the second similarity is obtained from the memory 4 when the second determination section 5d performs the determination, but is just an example. The method of determining the second similarity is not limited to this and can be arbitrarily changed. For example, the second similarity between the predetermined reference image and image of the region B in the frame image Fm may be newly calculated again at a predetermined timing for determination.

Moreover, the configuration of the image capturing device 100 shown in the aforementioned embodiment is just an example. The image capturing device 100 is not limited to such a configuration. For example, the particular object detection device of the invention is the image capturing device 100 by way of example but not limited to this. The frame images F to be processed are images generated from the capturing images in the above embodiment. However, if the particular object detection device is composed of a device different from the image capturing device 100, the frame images only should be just frame images successively acquired by a certain obtaining unit.

Moreover, in the above embodiment, the functions as the obtaining unit, first determination unit, second determination unit, and detection unit are implemented by the image obtaining section 5a, first determination section 5c, second determination section 5d, and image region specification section 5f of the image processing section 5, which are driven under the control of the central controller 11. However, the present invention is not limited to this. The CPU of the central controller 11 may be configured to execute predetermined programs or the like to implement the aforementioned functions.

Specifically, a program memory (not shown) configured to store programs including an obtaining process routine, a first determination process routine, a second determination process routine, and a specification process routine. The CPU of the central controller 11 may be configured to execute the obtaining process routine to function as the obtaining unit successively obtaining the frame images. Moreover, the CPU of the central controller 11 may be configured to execute the first determination process routine to function as the first determination unit determining whether the first similarity between the image of a candidate region (particular region) for the particular object image in the frame image Fn obtained by the obtaining unit and the image of the predetermined reference image as a criterion for determining the particular object image is equal to or more than a first threshold value. Moreover, the CPU of the central controller 11 may be configured to execute the second determination process routine to, if it is determined by the first determination unit that the first similarity of the image of the candidate region for the particular object image is equal to or more than the first threshold value, determine whether the second similarity between the predetermined reference image and the image of the region B (regions corresponding to the particular region) corresponding to the candidate region for the particular object image in the frame image Fm (frame image obtained before one frame image) which is a predetermined number of frames before the frame image Fn is higher than a second threshold value which is larger than the first threshold value. Moreover, the CPU of the central controller 11 may be configured to execute the specification process routine to specify, as a region C of the object image, the candidate region (particular region corresponding to region in the frame image obtained before) for the particular object image in the frame image Fn corresponding to the region B which is determined to have the second similarity equal to or more than the second threshold value.

In a similar manner, the CPU of the central controller 11 may be configured to execute a predetermined program or the like to implement the setting unit.

Furthermore, a computer-readable medium storing the programs to execute the aforementioned processes can be a nonvolatile memory such as a flash memory or a portable recording medium such as a CD-ROM as well as a ROM, a hard disk, or the like. Moreover, the medium providing data of the programs through a predetermined communication line can be a carrier wave.

The entire disclosure of Japanese Patent Application No. 2010-260028 filed on Nov. 22, 2010 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An object detection device, comprising:
   an obtaining unit configured to successively obtain frame images;
   an image storage unit configured to temporarily store the frame images, which are obtained by the obtaining unit at different times;
   a first similarity calculating unit configured to calculate a first similarity between (i) an image of a specific region in a first frame image stored in the image storage unit and (ii) a reference image, wherein the reference image is a criterion for determining a specific object image;
   a first determination unit configured to determine whether the first similarity calculated by the first similarity calculating unit is equal to or more than a first threshold value;
   a second similarity calculating unit configured to, when the first determination unit determines that the first similarity is equal to or more than the first threshold value, calculate a second similarity between (i) an image of a specific region in a second frame image stored in the image storage unit and (ii) the reference image, wherein the specific region in the second frame image corresponds to the specific region in the first frame image, and the second frame image is a frame image which is obtained a predetermined number of frames prior to the first frame image;
   a second determination unit configured to determine whether the second similarity calculated by the second similarity calculating unit is equal to or more than a second threshold value larger than the first threshold value; and
   a detection unit configured to detect the specific region of the first frame image as a region of a particular object image when the second determination unit determines that the second similarity is equal to or more than the second threshold value.

2. The object detection device of claim 1, further comprising:
   a storage unit configured to temporarily store a predetermined number of first similarities every time the first similarity calculating unit calculates the first similarity, and to temporarily store the second similarity, and
   a similarity obtaining unit configured to obtain the second similarity, which is stored in the storage unit and is calculated before the first similarity calculated by the first similarity calculating unit, wherein the second determination unit determines whether the second similarity obtained by the similarity obtaining unit is equal to or more than the second threshold value.

3. The object detection device of claim 1, wherein the specific region includes a face image.

4. The object detection device of claim 1, further comprising a setting unit configured to set an index marker on the object image.

5. The object detection device of claim 1, wherein the frame images are generated from a capturing image.

6. A method of detecting an object, comprising:
successively obtaining frame images;
temporarily storing the obtained frame images, which are obtained at different times;
calculating a first similarity between (i) an image of a specific region in a first frame image among the stored frame images and (ii) a reference image, wherein the reference image is a criterion for determining a specific object image;
determining whether the calculated first similarity is equal to or more than a first threshold value;
when it is determined that the first similarity is equal to or more than the first threshold value, calculating a second similarity between (i) an image of a specific region in a second frame image among the stored frame images and (ii) the reference image, wherein the specific region in the second frame image corresponds to the specific region in the first frame image, and the second frame image is a frame image which is obtained a predetermined number of frames prior to the first frame image;
determining whether the calculated second similarity is equal to or more than a second threshold value larger than the first threshold value; and
detecting the specific region of the first frame image as a region of a particular object image when it is determined that the second similarity is equal to or more than the second threshold value.

7. A non-transitory computer-readable medium storing a program for causing a computer included in an object detection device to function as:
an obtaining unit configured to successively obtain frame images;
an image storage unit configured to temporarily store the frame images, which are obtained by the obtaining unit at different times;
a first similarity calculating unit configured to calculate a first similarity between (i) an image of a specific region in a first frame image stored in the image storage unit and (ii) a reference image, wherein the reference image is a criterion for determining a specific object image;
a first determination unit configured to determine whether the first similarity calculated by the first similarity calculating unit is equal to or more than a first threshold value;
a second similarity calculating unit configured to, when the first determination unit determines that the first similarity is equal to or more than the first threshold value, calculate a second similarity between (i) an image of a specific region in a second frame image stored in the image storage unit and (ii) the reference image, wherein the specific region in the second frame image corresponds to the specific region in the first frame image, and the second frame image is a frame image which is obtained a predetermined number of frames prior to the first frame image;
a second determination unit configured to determine whether the second similarity calculated by the second similarity calculating unit is equal to or more than a second threshold value larger than the first threshold value; and
a detection unit configured to detect the specific region of the first frame image as a region of a particular object image when the second determination unit determines that the second similarity is equal to or more than the second threshold value.

* * * * *